US012764121B2

(12) United States Patent
Meltsner et al.

(10) Patent No.: US 12,764,121 B2
(45) Date of Patent: Oct. 13, 2026

(54) PRESENTING HIGH-LEVEL DESCRIPTIONS OF ACCESS PRIVILEGES WITHIN AN ORGANIZATION

(71) Applicant: Oracle International Corporation, Redwood Shores, CA (US)

(72) Inventors: Kenneth Joseph Meltsner, Portland, OR (US); Kent Arthur Spaulding, Portland, OR (US)

(73) Assignee: Oracle International Corporation, Redwood Shores, CA (US)

( * ) Notice: Subject to any disclaimer, the term of this patent is extended or adjusted under 35 U.S.C. 154(b) by 161 days.

(21) Appl. No.: 18/417,898

(22) Filed: Jan. 19, 2024

(65) Prior Publication Data

US 2025/0240301 A1 Jul. 24, 2025

(51) Int. Cl.
*H04L 9/40* (2022.01)

(52) U.S. Cl.
CPC .......... *H04L 63/105* (2013.01); *H04L 63/101* (2013.01)

(58) Field of Classification Search
CPC ............................ H04L 63/105; H04L 63/101
USPC .............................................................. 726/4
See application file for complete search history.

(56) References Cited

U.S. PATENT DOCUMENTS

| | | | | |
|---|---|---|---|---|
| 11,044,255 B1 * | 6/2021 | Scott | H04L 63/104 | |
| 11,711,374 B2 * | 7/2023 | Ross | G06F 21/604 | 726/28 |
| 2012/0310870 A1 * | 12/2012 | Caves | G06F 11/2247 | 706/14 |
| 2016/0021116 A1 * | 1/2016 | Maguire | H04L 63/08 | 726/4 |
| 2019/0158513 A1 * | 5/2019 | Shtar | G06F 21/552 | |

* cited by examiner

*Primary Examiner* — Jahangir Kabir
(74) *Attorney, Agent, or Firm* — Invoke

(57) ABSTRACT

Techniques are described herein that provide high-level views of roles, access permissions, and responsibilities for individuals within an organization. Organizational data, including detailed, low-level information on access permissions and attributes of individuals, are used to generate human-comprehensible role names and descriptions that individuals may be classified into. A list of outlier individuals is determined and presented, where outlier individuals have access permissions that do not align with the responsibilities of their assigned role.

20 Claims, 5 Drawing Sheets

Learning Management Coordinator

Individuals:
Lindsay Elkins
Paul Marne
Melissa Thomas

Responsibilities:
Overseeing curriculum development
Scheduling courses

Access Permissions:
Curricula Repository – View
Curriculum WIP – View, Modify
Course Schedules – View, Modify
Instructor Schedules – View

FIG. 3A

WARNING: POSSIBLE OUTLIER

Mary Jenkins
Role: Customer Support Representative

Responsibilities:
Providing phone-based customer support
Documenting customer interactions
Resolving technical support issues Access Permissions:
Code Repository, Project Orange – View, Modify, Delete
Database Administrator Tools – View, Modify

FIG. 3B

PRESENTING HIGH-LEVEL DESCRIPTIONS OF ACCESS PRIVILEGES WITHIN AN ORGANIZATION

TECHNICAL FIELD

The present disclosure relates to organizational data management, and more specifically, to methods for analyzing and optimizing access permissions, roles, and responsibilities within an organization, including presenting high-level descriptions of access privileges.

BACKGROUND

The field of organizational data management has grappled with the challenges of aligning access permissions and roles with the changing responsibilities of individuals within an organization. Traditional systems often rely on a hierarchical arrangement of functions and menus to define user privileges. Such systems present limitations in their ability to offer high-level, human-comprehensible role descriptions that accurately capture the diverse responsibilities associated with a particular job function.

Previous attempts to address this issue have ventured into role mining, a method wherein low-level privileges are analyzed to deduce common roles within an organization. However, these efforts have struggled to produce role definitions that are easily understandable to auditors and non-technical personnel, hindering their practical application.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 3A illustrates an example of a presentation of high-level access permissions within an organization in accordance with some embodiments.

FIG. 3B illustrates an example of a presentation of an outlier within the organization detected by the system in accordance with some embodiments.

DETAILED DESCRIPTION

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. ARCHITECTURAL OVERVIEW
3. PROVIDING HIGH-LEVEL DESCRIPTIONS OF ACCESS PERMISSIONS WITHIN AN ORGANIZATION
4. GENERATED ROLE EXAMPLE
5. OUTLIER EXAMPLE
6. HARDWARE OVERVIEW
7. MISCELLANEOUS; EXTENSIONS

1. GENERAL OVERVIEW

Techniques are described herein that provide high-level views of roles, access permissions, and responsibilities for individuals within an organization. Organizational data, including detailed, low-level information on access permissions and attributes of individuals, are used to generate human-comprehensible role names and descriptions that individuals may be classified into. A list of outlier individuals is determined and presented, where outlier individuals have access permissions that do not align with the responsibilities of their assigned role.

One or more embodiments described in this Specification and/or recited in the claims may not be included in this General Overview section.

2. ARCHITECTURAL OVERVIEW

Figure 1:
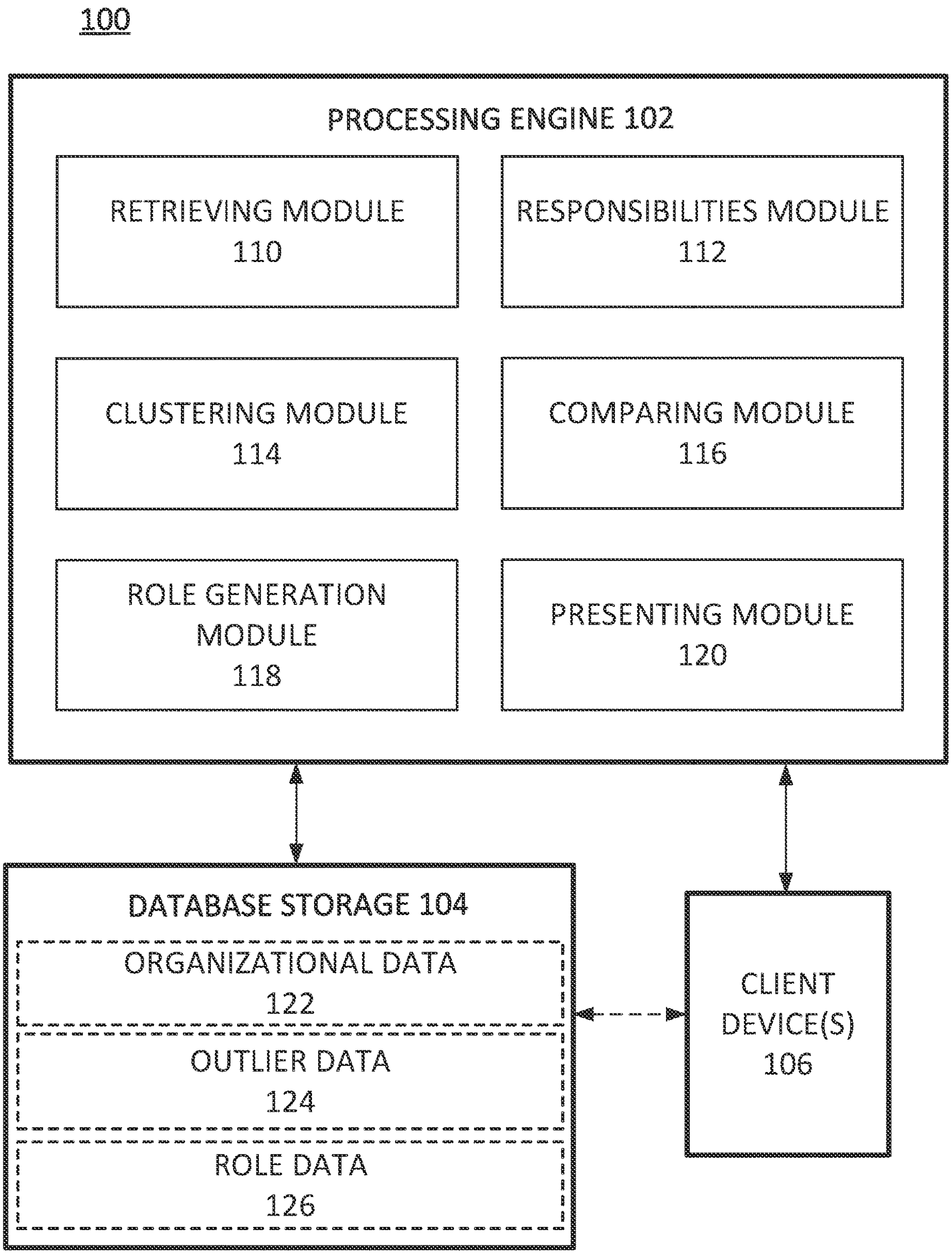
FIG. 1 illustrates a system in accordance with some embodiments.

FIG. 1 illustrates an exemplary system 100 in accordance with some embodiments. As illustrated in FIG. 1, the system 100 includes processing engine 102, database storage 104, and client device(s) 106. In the system 100, one or more client device(s) 106 are connected to a processing engine 102 and a database storage 104. The processing engine 102 is connected to the database storage 104 and optionally connected to one or more repositories and/or databases, including, e.g., an organizational data repository 122, an outlier data repository 124, and/or a role data repository 126. One or more of the databases may be combined or split into multiple databases. The client device(s) 106 in this environment may be one or more computers, and the processing engine 102 may be an application or software hosted on a computer or multiple computers that are communicatively coupled via remote server or locally.

In one or more embodiments, system 100 may include more or fewer components than the components illustrated in FIG. 1. The components illustrated in FIG. 1 may be local to or remote from each other. The components of processing engine 102, database storage 104, and/or client device(s) 106 may be distributed over multiple applications and/or machines. Multiple components may be combined into one application and/or machine. Operations described with respect to one component may instead be performed by another component.

Figure 2:
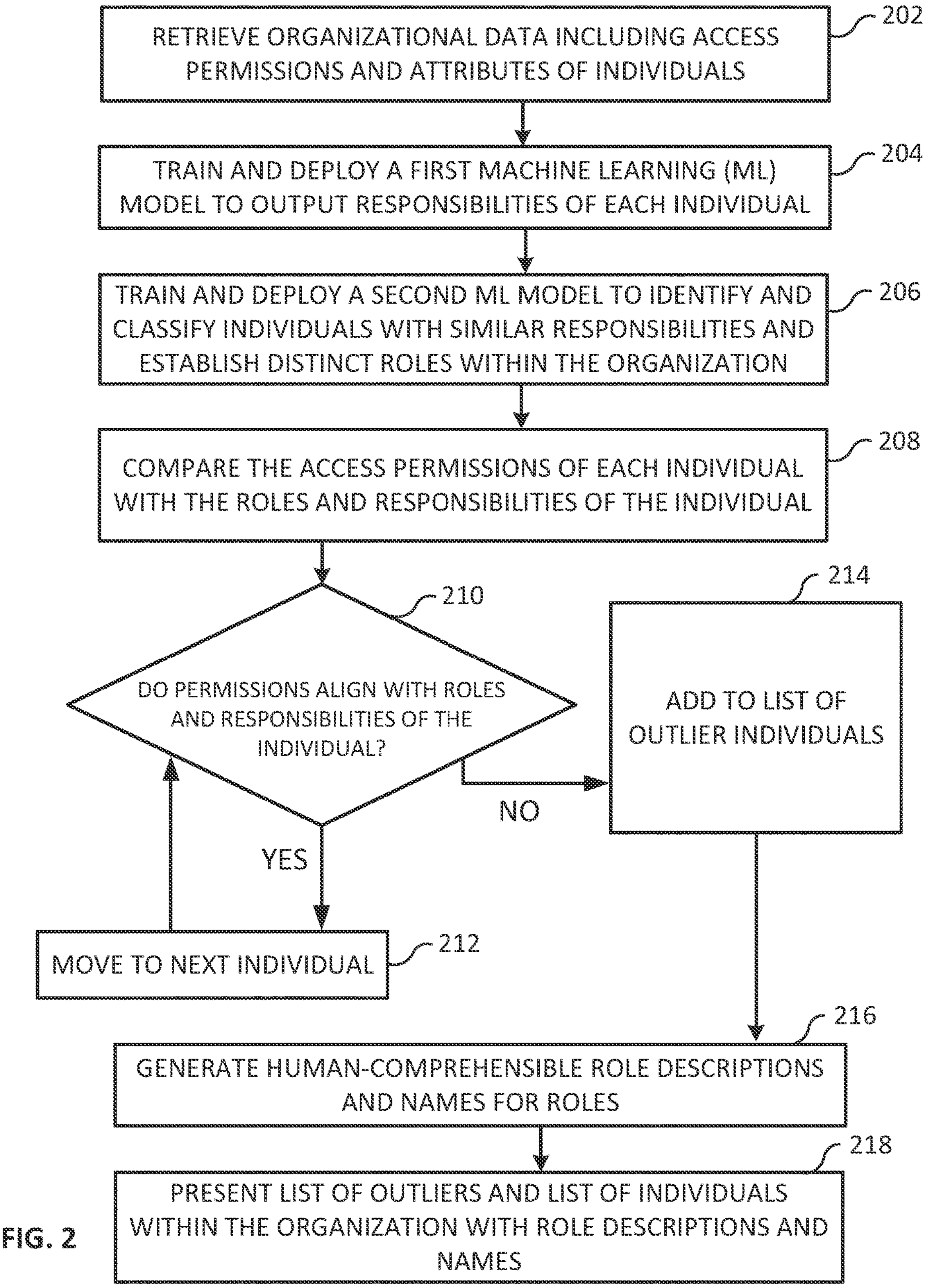
FIG. 2 illustrates an example set of operations for providing high-level descriptions of access privileges within an organization in accordance with some embodiments.

In one or more embodiments, processing engine 102 may perform the exemplary method of FIG. 2 or other method herein and, as a result, present high-level descriptions of access privileges. In one or more embodiments, this may be accomplished via communication with the client device(s) 106, database storage 104, and/or other device(s) over a network between the device(s) and an application server or some other network server. In one or more embodiments, the processing engine 102 is an application, browser extension, or other piece of software hosted on a computer or similar device, or is itself a computer or similar device configured to host an application, browser extension, or other piece of software to perform some of the methods and embodiments herein.

In one or more embodiments, client device(s) 106 are one or more computing devices that are connected to a computer network. A computing device generally refers to any hardware device that includes a processor. A computing device may refer to a physical device executing an application or a virtual machine. Examples of computing devices include, e.g., a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator ("NAT"), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In one or more embodiments, each of the client device(s) are associated with a respective set of computing resources. Computing resources may comprise, e.g., software and/or hardware resources used in the execution of one or more applications by the associated host. Example computing resources may include, e.g., central processing units ("CPUs"), network ports, database connections, user sessions, memory, operating systems, application instances, and virtual machine instances. Additionally, or alternatively, a host may include other computing resources, which may vary from one host to the next. In one or more embodiments, the processing engine 102 may be hosted in whole or in part as an application or web service executed on the client device(s) 106. In one or more embodiments, one or more of the database storage 104, processing engine 102, and client device(s) 106 may be the same device.

In various embodiments, database storage 104 constitutes optional repositories that can include one or more of, e.g., an organizational data repository 122 representing low-level organizational data on individuals within an organization, outlier data repository 124 representing a list of outlier individuals determined by the system, and a role data repository 126 representing roles within the organization, including names, descriptions, and individuals classified into those roles. The optional database(s) may also store and/or maintain any other suitable information for the processing engine 102 to perform elements of the methods and systems herein. In one or more embodiments, the optional database(s) can be queried by one or more components of system 100 (e.g., by the processing engine 102), and specific stored data in the database(s) can be retrieved.

In one or more embodiments, one or more components of system 100, including processing engine 102, may be implemented as or integrated into a cloud service, such as a software-as-a-service ("SaaS") or a platform-as-a-service ("PaaS").

Retrieving module 110 functions to retrieve a set of organizational data for an organization, including user data for each individual within the organization. The user data includes at least access permissions and attributes of the individuals.

Responsibilities module 112 functions to train and deploy a first machine learning model using the retrieved set of organizational data to output responsibilities of each individual within the organization.

Based on the output of the first ML model, clustering module 114 functions to train and deploy a second machine learning model to identify and classify individuals with similar responsibilities and establish distinct roles within the organization associated with the individuals within the organization.

Comparing module 116 functions to, for each individual within the organization, compare the access permissions of the individual with the roles and responsibilities of the individual to determine a list of one or more outlier individuals whose access permissions do not align with their roles and responsibilities.

Using a generative artificial intelligence (hereinafter "generative AI") language model, role generation module 118 functions to generate human-comprehensible role descriptions and names for roles within the organization.

Presenting module 120 functions to present the list of one or more outliers and a list of the individuals within the organization, the list of the individuals comprising human-comprehensive roles and names for each individual.

These modules and their functions will be described in further detail below with respect to FIG. 2.

3. PROVIDING HIGH-LEVEL DESCRIPTIONS OF ACCESS PERMISSIONS WITHIN AN ORGANIZATION

FIG. 2 illustrates an example set of operations for managing changes to a standard object using a custom view, in accordance with some embodiments. One or more operations illustrated in FIG. 2 may be modified, rearranged, or omitted altogether. Accordingly, the particular sequence of operations illustrated in FIG. 2 should not be construed as limiting the scope of one or more embodiments.

In an embodiment, the system retrieves a set of organizational data related to an organization that includes access permissions and attributes of individuals within the organization (Operation 202). In various embodiments, this data may include a variety of information, such as, e.g., user attributes, access permissions indicative of the specific functions or data each individual can access, detailed job descriptions, titles, and organizational positioning.

In one or more embodiments, the system retrieves a comprehensive set of organizational data for the organization. This organizational data is a repository of information pertaining to each individual within the organization. In one or more embodiments, this organizational data may include a detailed profile of their roles, responsibilities, and access permissions within the organizational framework. The data may include access permissions granted to each individual as well as attributes defining their distinct characteristics within the organizational structure.

In one or more embodiments, the user data retrieved includes access permissions granted to each individual. These access permissions may delineate, for example, the specific functions, menus, or actions they are authorized to perform. The user data may also include attributes associated with each individual. These attributes may span various information, including, e.g., user demographics, job-related details, or any other pertinent organizational information.

In one or more embodiments, the user data retrieved comprises a dataset with various kinds of organizational information that may include but are not limited to attributes such as, e.g., job titles, departmental affiliations, locations, employment status, and security clearance levels. This user data may further include access permissions detailing the specific functions or data that individuals can engage with across various systems. This may involve itemized records of systems, applications, or data sets that each individual has access to, whether by user account controls, group memberships, or other role-based entitlements.

In one or more embodiments, the user data retrieved may also incorporate detailed job descriptions that provide granular information about the duties and responsibilities associated with each role. This can enable an improved understanding of the permissions required by each role. The job descriptions may include relevant qualifications, key responsibilities, performance criteria, and any special access needs linked to the job function.

In one or more embodiments, the user data set offers operable organizational data that integrates both the structural hierarchy of the organization and the interrelations and interdependencies among different roles and departments. This may include information on reporting structures, team configurations, project allocations, and organizational charts. The user data might further include temporal data such as shift schedules, locations, and historical access logs that may be used to determine the context-specific access requirements.

In one or more embodiments, the system utilizes the set of organizational data, incorporating various forms of user data relevant to each individual within the particular organization. This set includes both the access permissions granted to the individuals and integration of, e.g., supplementary attributes, job descriptions, and organizational information. These attributes could include but are not limited to an individual's job title, departmental affiliation, length of service, and role-specific responsibilities. The integration of this diverse data spectrum aims to paint a detailed portrait of each user's organizational standing and systematically links their granted access permissions to their respective organizational function and position.

In one or more embodiments, the process of generating human-comprehensible role descriptions utilizes a generative AI language model that is capable of interpreting and consolidating the information in the organizational data. For individuals within the organization possessing identical or similar job titles, the generative AI consolidates the unique aspects of their roles based on the specific permissions, responsibilities, and attributes associated with each user. In some cases, this function may be utilized by organizations that employ general or ambiguous job titles, including a broad range of responsibilities and permissions, often leading to unnecessarily complex, obfuscated access control and governance.

In one or more embodiments, the system utilizes an extended set of organizational data that incorporates human resources information and location details. By analyzing the locations where individuals work and their associated human resources profiles, the system can further refine the assignment and understanding of permissions within the context of geographic and departmental structures. The added layer of location data provides significant value, particularly for organizations with multiple sites or complex organizational layouts, where access needs may significantly vary based on physical job location.

In an embodiment, the system trains and deploys a first machine learning (hereinafter "ML") model using the retrieved set of organizational data to output responsibilities of each individual within the organization (Operation 204). This ML model is configured to interpret the detailed user data and output a set of inferred responsibilities for each individual in the organization. In some embodiments, the system utilizes the ML model to transform low-level access permissions and other detailed user data into an understandable format that outlines what responsibilities each user holds. The output can then be used to help identify what level of access is appropriate for each individual, taking into consideration their specific roles within the organization.

An ML model, as used herein, is an algorithm that can be iterated to train a target model f that best maps a set of input variables to an output variable, using a set of training data. The training data includes datasets and associated labels. The datasets are associated with input variables for the target model f. The associated labels are associated with the output variable of the target model f. The training data may be updated based on, for example, feedback on the predictions by the target model f and accuracy of the current target model f. Updated training data is fed back into the machine learning algorithm, which in turn updates the target model f.

An ML model may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, backpropagation, and/or clustering.

In one or more embodiments, the training process of the ML model utilizes the organizational data as input, including the user attributes and access permissions. Through this process, the ML model learns about various relationships between the attributes and access permissions, discerning the slight differences in responsibilities that define the roles of each individual. The training enables the ML model to generalize patterns and associations, thereby enhancing its capacity to accurately infer responsibilities beyond the training dataset.

Once trained, the ML model is deployed within the organizational framework to perform real-time analyses. This deployment is an application of the learned patterns that allow the model to process new or updated data and generate outputs that encapsulate the responsibilities associated with each individual. The outputs provide a detailed and nuanced understanding of the roles and tasks that individuals undertake within the organization, forming a foundational layer for subsequent steps in the disclosed method.

In one or more embodiments, the first ML model may be designed to utilize supervised learning techniques to refine and establish the baseline for roles and responsibilities based on predefined criteria. This involves utilizing an existing framework of roles within the organization, each associated with specific permissions and access levels determined through thorough analysis of organizational rules, job responsibilities, and regulatory requirements. The supervised learning model is trained on this labeled data to identify patterns and correlations that signify a particular role or responsibility.

In one or more embodiments, this ML model may incorporate a training dataset comprised of a diverse range of user profiles, access permissions, and associated job titles. Through the training process, the model learns to differentiate between the slight differences between different roles, such as a 'Junior Analyst' and a 'Senior Analyst,' by recognizing the unique set of permissions granted to each title. This ensures that as the model assesses new or uncategorized user data, it can infer the most appropriate role for an individual based on the specific permissions and attributes associated with that user.

In one or more embodiments, the system may regularly update the ML model to account for changes in organizational roles and permissions structure. When roles are added, changed, or removed within the organization, or when the permissions associated with a role are modified, these updates can be reflected in the model through a retraining process. This retraining incorporates new data, maintaining the model's accuracy over time. The model can handle the changing nature of organizational shifts, ensuring that the roles and permissions continually reflect the current operational structure.

In an embodiment, based on the responsibilities outputted by the first ML model, a second ML model is trained and deployed to identify and classify the individuals into roles with similar responsibilities and establish distinct role groups within the organization (Operation 206). This second model utilizes clustering techniques or similar methods to analyze the user data and recognize patterns of access and behavior that suggest similar job functions or roles. By identifying these clusters of individuals who share similar permissions, it becomes simpler to manage and monitor access control, tailor permissions more effectively to actual organizational roles, and reduce unnecessary access that might pose security risks.

The output of the first ML model that encapsulates the responsibilities of each individual serves as input for the training of the second ML model. This input data enables the second model to differentiate between patterns and commonalities among responsibilities. Through the training process, the model learns to identify clusters of individuals who exhibit similarities in their roles. Once trained, the second ML model is deployed within the organizational framework, where it analyzes the responsibilities attributed to each individual. The model categorizes individuals into distinct roles based on shared responsibilities, effectively establishing a plurality of roles within the organization.

In one or more embodiments, the second ML model employs unsupervised learning methods to autonomously identify patterns within the set of organizational data without relying on predefined categories or roles. This approach allows the system to discern latent structures within the data, uncovering similarities and differences across user access permissions and attributes that might not be immediately apparent. By analyzing this data holistically, the unsupervised learning model can cluster individuals into distinct groups, each representing a particular composite of privileges that aligns with potential role definitions.

In one or more embodiments, the unsupervised learning techniques used by the second ML model may include, but are not limited to, clustering algorithms such as k-means, hierarchical clustering, and density-based spatial clustering of applications with noise (DBSCAN). The choice of algorithm can be adapted based on the characteristics of the data, such as dimensionality, distribution, and the presence of noise. The model iteratively groups users with similar access behaviors and adjusts the clusters as it processes more data, continuously refining the model's understanding of the underlying role dynamics within the organization. Clustering offers a flexible approach to role discovery, for it does not require pre-specified labels or rules, enabling the system to adapt to the unique operational context of each organization.

In one or more embodiments, once the unsupervised ML model has established clusters, the system determines a cluster's centrality or other statistical measures to further characterize the role. Members at the core of a cluster might represent archetypical examples of a specific role, while peripheral members could indicate transitional roles or individuals with mixed responsibilities. The system can utilize these insights to, for example, help administrators understand the nature of access within their organization, providing a means to identify standard, exceptional, and hybrid roles.

In an embodiment, the system compares each individual's access permissions to their identified roles and responsibilities to determine if there are any outliers, defined as individuals whose access permissions do not appropriately align with their role within the organization (Operation 208). This comparison may be used in the context of auditing and governance, enabling the identification of individuals who may have excessive or insufficient access permissions. The system determines whether the permissions for each individual aligns with the roles and responsibilities of that individual (Operation 210). If the permissions align with the roles and responsibilities of the individual, then the system proceeds to the next individual within the organization that is to be compared (Operation 212). If the permissions do not align with the roles and responsibilities of individuals, then the individual is added to the list of outlier individuals (Operation 214).

For each individual within the organization, the system compares the access permissions assigned to them with the roles and responsibilities identified through the ML models. The aim is to determine if an individual's access permissions align appropriately with the roles and responsibilities they hold within the organizational structure. In one or more embodiments, the process involves a systematic examination of the permissions granted to each individual in light of their defined roles as determined by the machine learning models. Through this comparison, the method identifies a list of outlier individuals. These are individuals whose access permissions deviate significantly from what is expected based on their roles and responsibilities. The identification of outliers may be used for flagging potential discrepancies or security vulnerabilities within the organizational access framework.

In one or more embodiments, the system identifies candidates for further access audits among the outlier individuals identified through the comparison of their access permissions with their roles and responsibilities. This step leverages the output of the second ML model that classifies individuals' roles based on similar responsibilities within the organization. By evaluating the alignment of current access permissions with the associated roles, the system pinpoints specific individuals whose granted permissions deviate from the expected permissions defined by their roles. These deviations may indicate either unnecessarily broad or missing permissions that could expose the organization to risks or hinder operational efficiency.

In one or more embodiments, after the identification of outliers, the system may prioritize these individuals for a detailed manual review and audit process. This review process could involve cross-referencing the outliers' actual job functions, historical access patterns, and any relevant organizational changes, such as recent promotions, department transfers, or project assignments. The purpose of this audit is to ascertain if the discrepancies noted by the system are justified or if corrective actions, such as permission adjustments, role updates, or policy modifications, are necessary.

In one or more embodiments, the system can generate and provide reports or dashboards that summarize the discrepancies for each outlier. In some instances, this may be used for enabling a comprehensive audit process. These summaries might include information like the specific permissions that are incongruent with the users' roles, the magnitude of the deviation from the norm, historical permission logs, and any related user attributes, such as department or job title. Auditors can utilize these summaries to quickly identify areas of concern and focus their investigative efforts where they are most needed.

In an embodiment, the system utilizes a generative AI language model to generate human-comprehensible descriptions and names for roles (Operation 216). The system utilizes generative AI techniques to automatically generate human-comprehensible role descriptions and names for the various roles identified within the organization. The generative AI language model, endowed with sophisticated natural language processing capabilities, plays a pivotal role in converting complex technical data into easily understandable and concise descriptions.

Generative AI as used herein refers to a subset of AI technologies designed to autonomously create new, contextually relevant content. In some cases, this process may involve natural language generation. In the current context, the generative AI language model is a sophisticated system capable of producing human-comprehensible role descriptions and names based on complex organizational data. Leveraging advanced machine learning techniques, including natural language processing and deep learning, generative AI is capable of autonomously generating coherent and contextually appropriate text.

In one or more embodiments, the generative AI translates the various machine-identified roles into language that is comprehensible to human stakeholders. Leveraging the generative AI's ability to synthesize coherent and contextually relevant language, the system transforms technical role information into accessible descriptions that resonate with individuals across diverse organizational functions. By employing generative AI techniques, the method ensures that the resulting role descriptions are both accurate and tailored to the cognitive understanding of non-technical personnel.

Moreover, the generative AI language model contributes to the process by providing names for each role. These names encapsulate the essence of the roles, enhancing their meaningful representation within the organization. The generated role descriptions and names serve as a bridge between the technical underpinnings of the machine learning models and the practical understanding of roles by organizational stakeholders. This integration of generative AI adds a layer of interpretability and accessibility, enriching the overall utility of the disclosed method in facilitating clear communication and comprehension of the identified roles within the organizational framework.

In one or more embodiments, the system uses a generative AI language model to differentiate the roles of one or more individuals within an organization who may be associated with the same or similar job titles. The differentiation process seeks to distill the essence of each individual's responsibilities and privileges based on a deep analysis of a variety of factors, including but not limited to their specific job functions, the nature of the access permissions granted, and other attributes relevant to their position. This approach recognizes that while job titles may be the same or similar, the actual duties and access needs of the individuals can vary widely based on factors like departmental differences, geographical location, special projects, or organizational structure.

In one or more embodiments, the generative AI language and natural language processing models may leverage a corpus of organizational data, including previously defined roles and responsibilities, job descriptions, and historical access patterns to accurately differentiate between similarly titled roles. The generative AI models are capable of recognizing patterns and inferring distinctions that may not be immediately apparent to human auditors or administrators. These distinctions are used to generate human-comprehensible role descriptions that accurately reflect each individual's position within the organization. In one or more embodiments, to further refine these role descriptions, the generative AI language model may solicit and include feedback from human experts, such as managers or human resources personnel, who have intimate knowledge of the subtleties and variations inherent in different job roles.

In one or more embodiments, the generative AI language model, when generating the human-comprehensible role descriptions, applies one or more summarization methods to condense detailed role information into concise labels for easier interpretation and use by auditors and security personnel. The summarization methods could include, but are not limited to, techniques such as extractive summarization that selects the most relevant sentences, phrases, or terms from the original information, abstractive summarization that interprets the main concepts and generates a new, shorter narrative, and hybrid summarization that combines features of both extractive and abstractive methods to enhance coherence and brevity.

In one or more embodiments, the use of summarization methods may be particularly effective in situations where role descriptions are derived from verbose or technical documentation, such as lengthy job descriptions, complex system permission sets, or detailed policy documents. The summarization process filters this information into elements that reflect the particular duties and access privileges associated with each role, while preserving the relevant context that defines the role's boundaries within the organization.

In one or more embodiments, the generative AI language model may incorporate ML techniques that learn from examples of succinct role descriptions curated by human experts. The training data can include pairs of lengthy descriptions and their corresponding expert-generated summarized titles or labels. Over time, the generative AI is expected to improve its ability to emulate human summarization skills and autonomously generate concise labels that maintain a high degree of fidelity to the original content.

In one or more embodiments, the generative AI language model includes an entity extraction feature that identifies and categorizes roles within the organization. The entity extraction process analyzes the job titles, position descriptions, and other textual data associated with individual users and distills these into relevant keywords and phrases that capture the core functions and responsibilities associated with various roles. By extracting significant entities such as job functions, department names, seniority levels, and particular or special qualifications from the detailed textual data, the AI model can effectively categorize roles that may have slight differences but are aggregated under similar overarching responsibilities.

In one or more embodiments, this generative AI language model assists in the translation of detailed and often cumbersome job titles or descriptions into role categories that align more closely with the access permissions pertinent to each role. For instance, a long title such as "Senior Executive Assistant in Charge of Interdepartmental Communications and Client Relations" could be simplified and categorized into its fundamental entities such as "Senior Executive Assistant," with key responsibilities of "Interdepartmental Communications" and "Client Relations," ensuring that access permissions reflect the actual scope of work and not extraneous details.

In one or more embodiments, the process of entity extraction both declutters the role titles and responsibilities and maintains an up-to-date access control model. By continuously analyzing and categorizing job roles based on entity extraction, the system can adapt to organizational changes, such as promotions, departmental restructuring, or the introduction of new technologies and responsibilities.

In one or more embodiments, the generative AI language model is configured to identify and utilize historical access patterns for enhancing role descriptions for individuals within an organization. The historical access patterns may include, but are not limited to, the frequency and type of access privileges exercised by individuals, the specific functions or data accessed over a historical time period, and the temporal patterns of such access, such as time of day, week, month, or even patterns associated with specific organizational events.

In one or more embodiments, the identification of historical access patterns is performed by analyzing logs of user activities recorded by the organization's information systems. The data extracted from these logs provides insight into the access privileges each individual holds as well as how these privileges are employed in the context of their daily work. The AI language model may then correlate these patterns with the roles and responsibilities of each individual; this could assist in determining if the access permissions align appropriately with the established roles.

In one or more embodiments, the AI language model applies ML algorithms to detect trends, anomalies, and behavioral consistencies within the historical access patterns. Through this analysis, the model can discern typical usage behaviors associated with certain roles and highlight deviations from these patterns. These insights can aid in fine-tuning the role descriptions by providing additional context that ties specific access behaviors to the responsibilities and expected activities of the roles.

In one or more embodiments, the generative AI language model utilizes NLP technology to analyze the evolving roles and responsibilities within the organization. This model is trained on a dataset that reflects changes in organizational structures, job functions, and employee activities. As the roles evolve over time, the generative AI language model captures these changes by continuously learning from new patterns and variations in the input data. This allows the system to adapt the role descriptions to be in-sync with the actual, on-the-ground responsibilities and functions of the individuals, thus maintaining the relevance and accuracy of the high-level descriptions generated.

In one or more embodiments, the generative AI language model is configured to receive and process updates to organizational policy, workflow alterations, and redefined job responsibilities to adapt the generated role descriptions. When a department introduces a new process, or when job duties are modified due to regulatory changes or strategic pivots, these updates can be inputted into the generative AI model. The AI model then re-evaluates the roles in question that are assimilated with the updated context, and generates revised role descriptions that reflect current organizational responsibilities and align with governance standards and compliance requirements.

In one or more embodiments, the evolutionary capability of the generative AI language model is further enhanced by integration with organizational feedback loops. For example, human resource databases and management feedback can be utilized to provide confirmation or revisions to evolving roles identified by the system. This feedback can include approvals, modifications, or rejections of proposed role descriptions the AI model uses as further training data to refine its generation process. Over time, this creates a customized AI model that is uniquely attuned to the organization's operational dynamics.

In one or more embodiments, the generative AI language model may take into account feedback from users or auditors presented with the roles and associated descriptions generated by the system. The feedback may be in the form of annotations, corrections, confirmations, or even qualitative assessments provided by users who are evaluating the accuracy, relevance, and comprehensibility of the role descriptions. Once this feedback is gathered, the generative AI language model applies ML techniques to refine and improve future descriptive outputs. This continuous learning process enables the AI to adjust its language models, extraction patterns, and summarization methods to more closely align the role descriptions with the data it processes, thus enhancing the overall user experience and the functional utility of the role descriptions in governance and auditing contexts.

In one or more embodiments, the generative AI language model is designed to continually improve by learning from a variety of sources including, but not limited to, regular updates of organizational roles, user feedback, and general corrections. The system provides a mechanism that allows users to interact with the generated role descriptions, for example, by suggesting more accurate phrasings or by pointing out inconsistencies or inaccuracies that may have arisen due to shifts in organizational roles or errors in the initial AI-generated text.

In one or more embodiments, the generative AI language model may also request feedback from users through interactive systems or surveys each time role descriptions are generated and delivered to the users. Users can then provide their input on how well these descriptions match their understanding of the roles or the correctness according to the company's standards. The AI model aggregates this feedback data and utilizes it to train its algorithms, enabling it to maintain a high level of correctness and relevance in its descriptive outputs. The feedback loop thereby serves as a means to personalize the language model to the specific terminology, vernacular, and contextual understanding present within the unique organizational culture.

In one or more embodiments, the system may integrate user access permissions with user work shift patterns to generate and tailor role descriptions. This integration may factor in the static set of privileges assigned to each individual as well as the temporal context where these permissions are typically exercised. For instance, certain permissions may be permissible during a user's regular daytime shifts but not during off-hours unless the user is identified as an on-call staff or a night shift worker. By examining clock-in and clock-out data or scheduled versus actual working hours, the system can associate levels of access permissions with work shift patterns to produce more accurate role descriptors that reflect both the access privileges and the specific usage scenarios tied to an individual's work schedule.

In one or more embodiments, integrating access permissions with work shift patterns extends to include generating access models that predict and provision for periodic or situational access needs. These models may account for variations such as seasonal workloads, special projects, or emergency response situations that necessitate temporary changes in a user's access permissions. By incorporating continuity and context into role descriptions, the system may identify patterns that warrant the conditional granting of additional permissions, or the temporary elevation of a user's role, during such special circumstances, thus facilitating responsive and adaptive access control practices within the organization.

In one or more embodiments, the system may further optimize the assignment and reassignment of access permissions based on work shift patterns to improve security and efficiency. By automatically adjusting user permissions in accordance with their forecasted work shifts, an organization can reduce the risk of unauthorized access during off-hours and enable the right level of access for individuals when they need it. Additionally, this integration can aid in audit and compliance efforts by providing a clear rationale for why a specific set of access permissions has been granted based on an individual's work schedule and responsibilities as reflected in the tailored role descriptions.

In one or more embodiments, the generative AI language model employs natural language processing (hereinafter "NLP") algorithms to generate human-comprehensible role descriptions. NLP is a field of study that focuses on the interaction between computers and natural (human) languages. Specifically, NLP algorithms are designed to understand, interpret, and generate human language in a way that is both meaningful and contextually relevant. The generative AI language model applies these NLP techniques to analyze the dataset comprising user attributes, access permissions, and organizational roles, processing this information to produce accurate and coherent narratives that describe the responsibilities associated with each role within the company.

In one or more embodiments, the generative AI language model applying NLP is particularly adept at parsing complex and unstructured text data, including job descriptions, HR records, access logs, and other related documents. The model processes this textual data to recognize patterns, extract relevant entities (such as job titles, department names, access rights), and understand the context behind access rights assignments. With the help of NLP, the generative AI model is capable of synthesizing this information into logical groupings that can substantially aid in role definition and the elucidation of access control structures.

In one or more embodiments, the generative AI language model further refines its output through an iterative learning process directed by NLP. This processing involves evaluating the semantics of the role descriptions it generates, ensuring that they align with the standards and terminologies commonly understood by human governance and security experts. This iterative approach enables the AI to learn from previous output and any feedback provided; this can lead to ongoing enhancements in the clarity and utility of the role descriptions. As the AI model iterates, it hones its ability to provide concise and clear summaries of roles and associated privileges that can be easily used by auditors and compliance officers in governance processes.

In one or more embodiments, the system continually validates the alignment between individual access permissions and their designated roles and responsibilities. Such periodic reevaluation is implemented within the system to account for changes in organizational structure and individual job functions. As individuals within the organization may undergo changes in their roles, receive promotions, transfer between departments, or exit the company, their access permissions need to be reassessed to ensure they remain appropriate and secure. The system employs the ML model(s) to analyze the most current data reflecting any changes in roles, responsibilities, or attributes associated with the users.

In one or more embodiments, the reevaluation process leverages a scheduling mechanism set within the system to periodically trigger the ML model(s) to perform an analysis. This scheduled reevaluation can occur at predefined intervals, such as daily, weekly, monthly, or as dictated by organizational policies or compliance requirements. The scheduling mechanism allows the system to periodically conduct reevaluations without necessitating manual intervention.

In one or more embodiments, during the reevaluation phase, the system may employ both supervised and unsupervised learning techniques to analyze if there have been any deviations in the access patterns of individuals compared to the defined model of their role's responsibilities. The system may flag individuals whose access permissions no longer align with their roles, indicating potential risks or misalignments. These flagged cases prompt a further review or trigger automated corrective actions, such as revoking access rights or notifying governance personnel for oversight. The system's ML-driven reevaluation supports the organization's ongoing efforts to enforce strong security practices and ensure regulatory compliance.

In one or more embodiments, the system applies ML models, specifically NLP algorithms, to process, analyze, and interpret textual data related to individual roles and their associated access permissions within an organization. The NLP algorithms may include capabilities such as sentiment analysis, part-of-speech tagging, named entity recognition, and relationship extraction. These applications are used to intelligently parse human resource documents including job descriptions, role responsibilities, titles, and other related documentation to aid in the generation of human-comprehensible role descriptions.

In one or more embodiments, the NLP techniques are utilized to identify key terms, phrases, and language patterns that hold significance in describing job functions and access privileges. By evaluating linguistic structures and context, the system can extract meaningful labels and descriptive elements that accurately reflect individual roles within an organization. For example, the system could detect a term like "Senior Software Engineer" and differentiate between its various specializations, such as "Release Engineer" or "Java Application Developer," by analyzing additional contextual information derived from access permissions, organizational responsibilities, and work location data.

In one or more embodiments, the intelligent NLP systems contribute to refining and improving the coherence of the generated role descriptions over time. As the organization evolves, roles can merge, divide, or shift in responsibilities, and the NLP system would track these changes through continuous learning and adaptation. The role descriptions, therefore, remain up-to-date and relevant, supporting ongoing organizational compliance and governance efforts. Additionally, the NLP system could employ feedback loops, capturing insights and corrections provided by human auditors and organizational experts to fine-tune the generated descriptions.

In an embodiment, the system presents the list of one or more outliers and a list of the individuals within the organization, the list of the individuals including human-comprehensible roles, and names for each individual (Operation 218). The system may essentially present an overview encapsulating both outlier individuals and the entirety of the organization's personnel. This presentation may be displayed on one or more client devices within a user interface, such as a dashboard or notification. The client devices may be associated with various stakeholders within the organization. These stakeholders can efficiently review and interpret the data, making decisions regarding access permissions, role assignments, and potential corrective actions. The list of outliers may prompt targeted investigation, for example, allowing organizations to proactively address security concerns and ensure alignment between individual responsibilities and granted access.

In one or more embodiments, the system tracks changes in roles and permissions over time to update the role descriptions. This ensures that as an individual's access permissions evolve due to changes in job responsibilities, promotions, departmental moves, or organizational restructuring, the role descriptions remain accurate and relevant. The system automatically monitors for any alterations in user data, such as changes in job titles or adjustments to access permissions, and triggers an update process for the role descriptions. By maintaining a time-stamped log of user data and permissions changes, the system provides a historical record, facilitating retrospective audits and accountability.

In one or more embodiments, the system tracks changes via an automated monitoring system that is integrated with the organization's human resources management systems and access control systems. When an action occurs that affects an individual's roles or permissions, such as a database entry indicating a new job position or a revised access rights assignment, the ML models and generative AI components of the system are invoked. These components reevaluate the existing clusters and update the role descriptions to reflect the current organizational landscape. The updated descriptions may then be presented to security and governance experts for review, ensuring continuous alignment of access privileges with job responsibilities.

In one or more embodiments, the system utilizes version control mechanisms to manage the evolution of role descriptions. Each update to a role description can be tagged with a unique identifier, a timestamp, and metadata describing the nature of the change. This systematic tracking enables users to quickly ascertain the most up-to-date role descriptions, understand the changes over time, and make informed decisions about access permissions.

In one or more embodiments, the generative AI language model employed in the system is specifically tailored to adapt high-level role descriptions and names to suit the context of an individual organization. This means that the system does not merely apply a generic role-naming convention but takes into account the unique culture, norms, and terminologies prevalent in the organization. Organizational contexts, such as the industry sector, internal hierarchies, specific job functions, and the languages or jargons used internally can significantly influence how responsibilities and titles are framed and understood. By considering these factors, the generative AI language model crafts role descriptions that are clear and comprehensible to internal stakeholders and also resonate with their day-to-day experiences and expectations of role duties within their specific organizational context.

In one or more embodiments, the generative AI language model utilizes a range of data inputs including, but not limited to, existing job titles, departmental structures, staff directories, internal reports, and other organizational documents to achieve a deeper understanding of how the organization operates. Leveraging NLP techniques, the model analyzes this data to detect patterns, infer slight distinctions between similar titles, and encapsulate the essence of each role in terminology that reflects the organization's internal naming conventions. The generative AI language model may incorporate domain-specific ontologies or lexicons that provide a framework for constructing role names and descriptions that align with professional standards and nomenclatures used within the industry.

In one or more embodiments, the adaptability of the generative AI language model extends to incorporate real-time changes and updates within the organization. As responsibilities evolve over time due to restructuring, implementation of new systems, or changes in operational focus, the role descriptions and titles generated by the model can be dynamically updated. The system may be connected to the organization's human resources information system (HRIS) or similar platforms to receive continuous updates on role requirements or changes in the organizational chart. This ensures that at any given time, the role descriptions provided by the system are current and accurately reflect the actual responsibilities tied to the access permissions within the system.

In one or more embodiments, the system provides automated provisioning of access privileges for new employees. When setting up a new user within the organization, the system uses its understanding of roles and associated access rights. This process ensures that new employees are provisioned with precisely the access privileges required for their designated roles in order to enable onboarding. In one or more embodiments, administrators can configure the system to either provide new users with a base set of privileges or, alternatively, grant them the maximum set of privileges associated with a specific cluster of roles. In one or more embodiments, the system operates within specific time snapshots so that access privileges can be provisioned accurately based on the most recent and relevant organizational data.

4. GENERATED ROLE EXAMPLE

FIG. 3A illustrates an example of a presentation of high-level access permissions within an organization in accordance with some embodiments.

The presentation includes a human-comprehensible description and name of one particular role within the organization. The generated name of the role is "Learning Management Coordinator", and the generated responsibilities for the role include "overseeing curriculum development" and "scheduling courses". Meanwhile, the access permissions for this role and these individuals are "curricula repository—view", "curriculum WIP—view, modify", "course schedules—view, modify", and "instructor schedules—view". A list of individuals who align with this role is provided as well. The system has grouped and classified these individuals within this particular role, generated the name and human-comprehensible description, and included a set of responsibilities and access permissions common to this role and these individuals.

This presentation facilitates a quick overview of the role's occupants, their designated responsibilities, and the corresponding access permissions granted to fulfill those responsibilities. Stakeholders can easily interpret this information, ensuring transparency and aiding in efficient decision-making regarding access control and organizational responsibilities.

To further support stakeholder decision-making, the user interface includes interactive features. For instance, users may have the ability to click on an individual's name to access more detailed information about their assigned roles, responsibilities, and historical access patterns. Additionally, the interface may offer options for stakeholders to initiate corrective actions directly from the interface, such as adjusting access permissions, reassigning roles, or performing one or more audits for detailed investigation. Stakeholders can thus leverage the presented information for effective governance and security management.

5. OUTLIER EXAMPLE

FIG. 3B illustrates an example of a presentation of an outlier within the organization detected by the system in accordance with some embodiments. The presentation includes the message "Warning: Possible Outlier" to present a clear notification to stakeholders that there may be one or more significant differences between the individual's role and responsibilities and the access permissions associated with that individual.

Here, the role "customer support representative", with responsibilities including providing customer support, documenting customer interactions, and resolving technical support issues, does not align with the access permissions of the individual. Specifically, viewing, modifying, and deleting a code repository for a project would align more with a lead project manager for the project, and viewing and modifying database administrator tools would align more with the access permissions of a higher-level database administrator. As in FIG. 3A, stakeholders are provided with multiple options for resolving any possible issues with this outlier individual, including adjusting access permissions, reassigning roles, and performing audits.

5. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
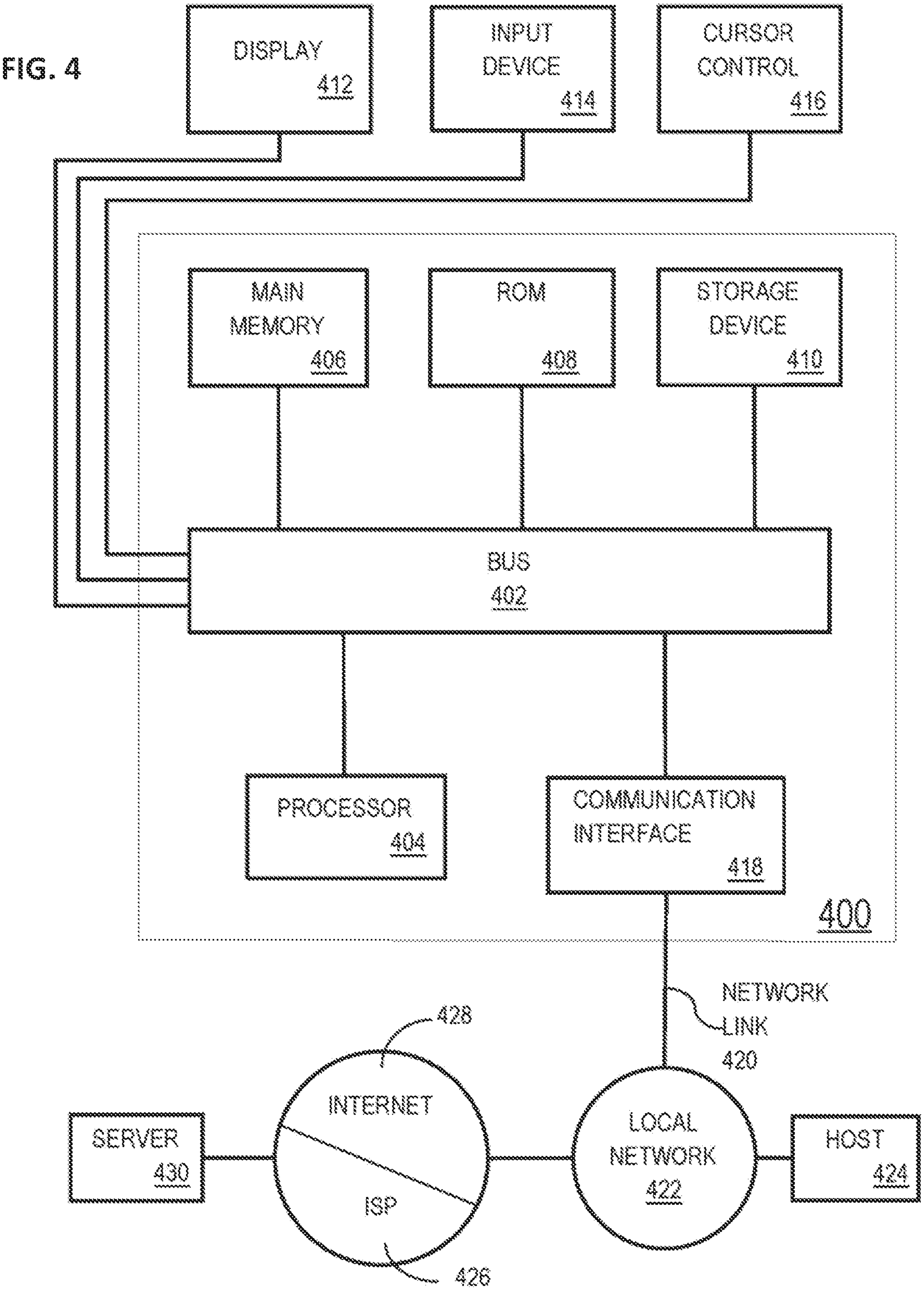
FIG. 4 illustrates a computer system where some embodiments may be implemented.

For example, FIG. 4 illustrates a computer system upon which some embodiments may be implemented. Computer system 400 includes a bus 402 or other communication mechanism for communicating information, and a hardware processor 404 coupled with bus 402 for processing information. Hardware processor 404 may be, for example, a general-purpose microprocessor.

Computer system 400 also includes a main memory 406, such as a random-access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic, or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

7. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method comprising:

retrieving a set of organizational data for an organization, the set of organizational data comprising user data for each individual within the organization, the user data comprising at least access permissions and attributes of the individuals;

training and deploying a first machine learning (ML) model using the retrieved set of organizational data to output responsibilities of each individual within the organization, wherein the first ML model infers the responsibilities of each individual as a function of the user data of the individuals, wherein the responsibilities inferred by the first ML model represent tasks that each individual undertakes within the organization;

based on the responsibilities output by the first ML model, training and deploying a second ML model to identify and classify individuals with similar responsibilities and establish a plurality of distinct roles within the organization associated with the individuals within the organization, wherein the second ML model is trained as a function of the responsibilities output by the first ML model;

for each individual within the organization, comparing the access permissions of the individual with the roles and responsibilities of the individual to determine a list of one or more outlier individuals whose access permissions do not align with said roles and responsibilities;

generating, using a generative artificial intelligence (AI) language model based on the responsibilities output by the first ML model and the plurality of distinct roles classified by the second ML model, human-comprehensible role descriptions and names for roles within the organization, wherein the generative AI model generates the human-comprehensible role descriptions within the organization based on access patterns associated with said roles and adapts the role descriptions responsive to learning new access patterns; and presenting the list of one or more outliers individuals, wherein presenting the list of one or more outlier individuals comprises generating an interface that identifies (a) the human-comprehensible role descriptions and role names output by the generative AI language model for each outlier individual, (b) names for each outlier individual, and (c) the access permissions that do not align with said roles and responsibilities.

2. The method of claim 1, wherein the retrieved set of user data comprises one of more of: user attributes, access permissions, job descriptions, and organizational data.

3. The method of claim 1, wherein generating the human-comprehensible role descriptions comprises the generative AI language model differentiating the roles of one or more individuals within the organization associated with the same job titles.

4. The method of claim 1, wherein the set of organizational data further comprises human resources information and location details.

5. The method of claim 1, wherein the generative AI language model utilizes one or more summarization methods to condense role descriptions into concise labels.

6. The method of claim 1, wherein the first ML model uses supervised learning techniques to define responsibilities based on predefined roles and permissions.

7. The method of claim 1, wherein the second ML model employs unsupervised learning to identify and classify individuals into roles without predefined role definitions.

8. The method of claim 1, further comprising:
identifying candidates for further access audits among the one or more outlier individuals.

9. The method of claim 1, wherein the generative AI language model utilizes entity extraction to categorize roles based on detailed attributes.

10. The method of claim 1, wherein the generative AI language model adapts role descriptions to one or more evolving organizational responsibilities.

11. The method of claim 1, further comprising:
tracking changes in roles and permissions over time to update the role descriptions.

12. A system comprising:
at least one device including a hardware processor;
the system being configured to perform operations comprising:
retrieving a set of organizational data for an organization, the set of organizational data comprising user data for each individual within the organization, the user data comprising at least access permissions and attributes of the individuals;
training and deploying a first machine learning (ML) model using the retrieved set of organizational data to output responsibilities of each individual within the organization, wherein the first ML model infers the responsibilities of each individual as a function of the user data of the individuals, wherein the responsibilities inferred by the first ML model represent tasks that each individual undertakes within the organization;
based on the responsibilities output by the first ML model, training and deploying a second ML model to identify and classify individuals with similar responsibilities and establish a plurality of distinct roles within the organization associated with the individuals within the organization, wherein the second ML model is trained as a function of the responsibilities output by the first ML model;
for each individual within the organization, comparing the access permissions of the individual with the roles and responsibilities of the individual to determine a list of one or more outlier individuals whose access permissions do not align with said roles and responsibilities;
generating, using a generative artificial intelligence (AI) language model based on the responsibilities output by the first ML model and the plurality of distinct roles classified by the second ML model, human-comprehensible role descriptions and names for roles within the organization, wherein the generative AI model generates the human-comprehensible role descriptions within the organization based on access patterns associated with said roles and adapts the role descriptions responsive to learning new access patterns; and
presenting the list of one or more outliers individuals, wherein presenting the list of one or more outlier individuals comprises generating an interface that identifies (a) the human-comprehensible role descriptions and role names output by the generative AI language model for each outlier individual, (b) names for each outlier individual, and (c) the access permissions that do not align with said roles and responsibilities.

13. The system of claim 12, wherein the generative AI language model integrates job descriptions, organizational data, and access patterns to generate the role descriptions.

14. The system of claim 12, wherein the generative AI language model refines role descriptions based on user feedback.

15. The system of claim 12, wherein the system is further configured to perform the operation of:
integrating access permissions with one or more work shift patterns to generate the role descriptions.

16. The system of claim 12, wherein the generative AI language model utilizes natural language processing for role description generation.

17. The system of claim 12, wherein the system is further configured to perform the operation of:
periodically reevaluating access permissions to enable continued alignment with roles and responsibilities.

18. The system of claim 12, wherein the generative AI language model adapts role descriptions to specific organizational contexts.

19. A non-transitory computer-readable medium containing instructions comprising:
retrieving a set of organizational data for an organization, the set of organizational data comprising user data for each individual within the organization, the user data comprising at least access permissions and attributes of the individuals;
training and deploying a first machine learning (ML) model using the retrieved set of organizational data to output responsibilities of each individual within the organization, wherein the first ML model infers the responsibilities of each individual as a function of the user data of the individuals, wherein the responsibilities inferred by the first ML model represent tasks that each individual undertakes within the organization;
based on the responsibilities output by the first ML model, training and deploying a second ML model to identify and classify individuals with similar responsibilities and establish a plurality of distinct roles within the organization associated with the individuals within the organization, wherein the second ML model is trained as a function of the responsibilities output by the first ML model;
for each individual within the organization, comparing the access permissions of the individual with the roles and responsibilities of the individual to determine a list of one or more outlier individuals whose access permissions do not align with said roles and responsibilities;
generating, using a generative artificial intelligence (AI) language model based on the responsibilities output by the first ML model and the plurality of distinct roles classified by the second ML model, human-comprehensible role descriptions and names for roles within the organization, wherein the generative AI model generates the human-comprehensible role descriptions within the organization based on access patterns associated with said roles and adapts the role descriptions responsive to learning new access patterns; and
presenting the list of one or more outliers individuals, wherein presenting the list of one or more outlier individuals comprises generating an interface that identifies (a) the human-comprehensible role descriptions and role names output by the generative AI language model for each outlier individual, (b) names for each outlier individual, and (c) the access permissions that do not align with said roles and responsibilities.

20. The non-transitory computer-readable medium of claim 19, wherein the generative AI language model integrates job descriptions, organizational data, and access patterns to generate the role descriptions.

* * * * *